(12) United States Patent
Sheldon

(10) Patent No.: US 8,967,800 B2
(45) Date of Patent: Mar. 3, 2015

(54) METHOD OF MAKING EYEWEAR HAVING FLEXIBLE FRAME WITH RIGID LENS RETAINER

(71) Applicant: Brent Sheldon, Montreal (CA)

(72) Inventor: Brent Sheldon, Montreal (CA)

( * ) Notice: Subject to any disclaimer, the term of this patent is extended or adjusted under 35 U.S.C. 154(b) by 58 days.

(21) Appl. No.: 13/759,306

(22) Filed: Feb. 5, 2013

(65) Prior Publication Data
US 2014/0218678 A1    Aug. 7, 2014

(51) Int. Cl.
*G02C 13/00* (2006.01)
*G02C 7/02* (2006.01)
*B29D 12/02* (2006.01)

(52) U.S. Cl.
CPC .............. *G02C 13/001* (2013.01); *B29D 12/02* (2013.01)
USPC ..................... 351/178; 351/159.01

(58) Field of Classification Search
CPC ........................................................ G02C 5/00
USPC ................................ 351/178, 158
See application file for complete search history.

(56) References Cited

U.S. PATENT DOCUMENTS

| | | | |
|---|---|---|---|
| 3,838,914 A | 10/1974 | Fernandez | |
| 4,196,982 A | 4/1980 | Watkins | |
| 6,517,202 B2 | 2/2003 | Huang | |
| 6,601,954 B2 | 8/2003 | Menon | |
| 6,896,365 B1 | 5/2005 | Lin | |
| 6,899,427 B1 | 5/2005 | Sheldon | |
| 6,959,988 B1 | 11/2005 | Sheldon | |
| 6,971,745 B2 | 12/2005 | Sheldon | |
| 7,316,479 B1 | 1/2008 | Matera | |
| 7,325,919 B2 | 2/2008 | Sheldon | |
| 7,431,452 B2 | 10/2008 | Sheldon | |
| 7,524,054 B2 | 4/2009 | Sheldon | |
| 7,819,522 B2 | 10/2010 | Sheldon | |
| 2005/0036101 A1 | 2/2005 | Actis-Datta | |
| 2005/0073643 A1 | 4/2005 | Sheldon | |
| 2005/0254001 A1 | 11/2005 | Winningham | |
| 2006/0050227 A1 | 3/2006 | Fernandez et al. | |
| 2007/0132944 A1 | 6/2007 | Sheldon | |
| 2007/0279576 A1* | 12/2007 | Sheldon | 351/41 |
| 2009/0115960 A1* | 5/2009 | Sheldon | 351/140 |
| 2011/0001922 A1* | 1/2011 | Sheldon | 351/154 |

FOREIGN PATENT DOCUMENTS

| | | |
|---|---|---|
| CA | 2752231 | 9/2010 |
| CA | 2710357 | 8/2011 |
| WO | 2009055921 | 5/2009 |

OTHER PUBLICATIONS

International Search Report dated Apr. 2, 2014 issued on Applicant's corresponding PCT International Application No. PCT/CA2014/050029 (International Application Filing date Jan. 17, 2014).

* cited by examiner

*Primary Examiner* — Jordan Schwartz
(74) *Attorney, Agent, or Firm* — Klintworth & Rozenblat IP LLC

(57) ABSTRACT

A lens is permanently engaged with a substantially rigid lens retaining apparatus to form a lens unit during a formation molding process of the lens retaining apparatus. The rigid lens retaining apparatus is permanently engaged with a substantially flexible eyewear frame during a formation molding process of the frame. Therefore, a secure attachment of lenses to the substantially flexible eyewear frame through rigid lens retaining apparatus is provided.

13 Claims, 6 Drawing Sheets

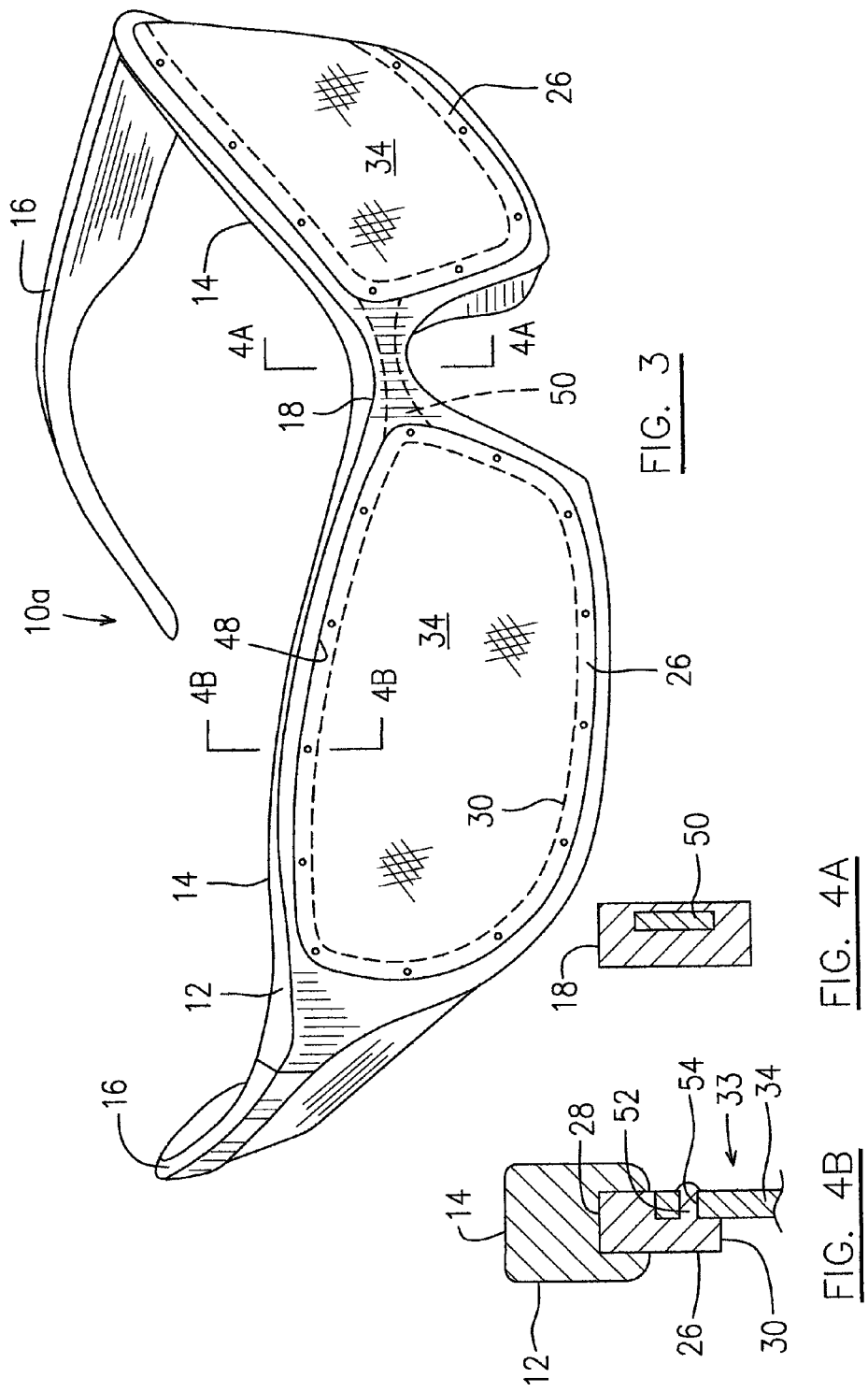

US 8,967,800 B2

METHOD OF MAKING EYEWEAR HAVING FLEXIBLE FRAME WITH RIGID LENS RETAINER

TECHNICAL FIELD

The described subject matter relates to eyewear, and more particularly to a method of making eyewear having a substantially flexible frame with a rigid lens retaining apparatus for securing one or more lenses to the eyewear frame.

BACKGROUND OF THE ART

Conventional eyewear generally includes an eyewear frame with a head support apparatus and one or more lenses attached to the frame. For example, the eyewear frame may be made of substantially rigid plastic material and configured to define one or two lens openings for releasably engaging one or two lenses with the rigid frame. These eyewear include a variety of eyeglasses, such as sunglasses, protective work glasses, sports goggles, etc.

There is a demand for more varieties of eyewear to satisfy new functional requirements and new fashions. Therefore, there is a need for eyewear of different types such as eyeglasses or goggles, having substantially flexible eyewear frames in which lenses are securely attached to the eyewear structure. For example, a method of making glasses having a flexible frame with a rigid lens retainer has been described in the Applicant's U.S. Pat. No. 7,819,522. Further improvement of production techniques for such eyewear, is desirable.

SUMMARY

In accordance with one aspect of the described subject matter there is a method of making eyewear comprising: (a) providing at least one lens; (b) providing a lens retainer molding device for molding at least one lens retainer for engaging the at least one lens; (c) forming the at least one lens retainer with a first molding material using the lens retainer molding device with the at least one lens present during a first molding process, producing at least one lens unit having the at least one lens retainer, the at least one lens retainer being substantially rigid and permanently engaging at least a part of a peripheral portion of the at least one lens; (d) providing a frame molding device for molding a frame for holding the at least one lens unit; and (e) forming the frame with a second molding material using the frame molding device with the at least one lens unit present during a second molding process, the frame being substantially flexible and permanently engaging the at least one lens retainer to form at least a front section of the eyewear.

BRIEF DESCRIPTION OF THE DRAWINGS

Having thus generally described the nature of the described subject matter, reference will now be made to the accompanying drawings in which:

FIG. 3 is a perspective view of eyewear according to another embodiment of the described subject matter;

FIG. 4A is partial cross-sectional view of the eyewear of FIG. 3 taken along line 4A-4A, showing a connection portion embedded in the eyewear frame to interconnect two rigid lens retainers;

FIG. 4B is a partial cross-sectional view of the eyewear of FIG. 3 taken along line 4B-4B, showing a structural arrangement thereof;

It will be noted that throughout the appended drawings, like features are identified by like reference numerals.

DETAILED DESCRIPTION OF THE PREFERRED EMBODIMENT

Figure 1:
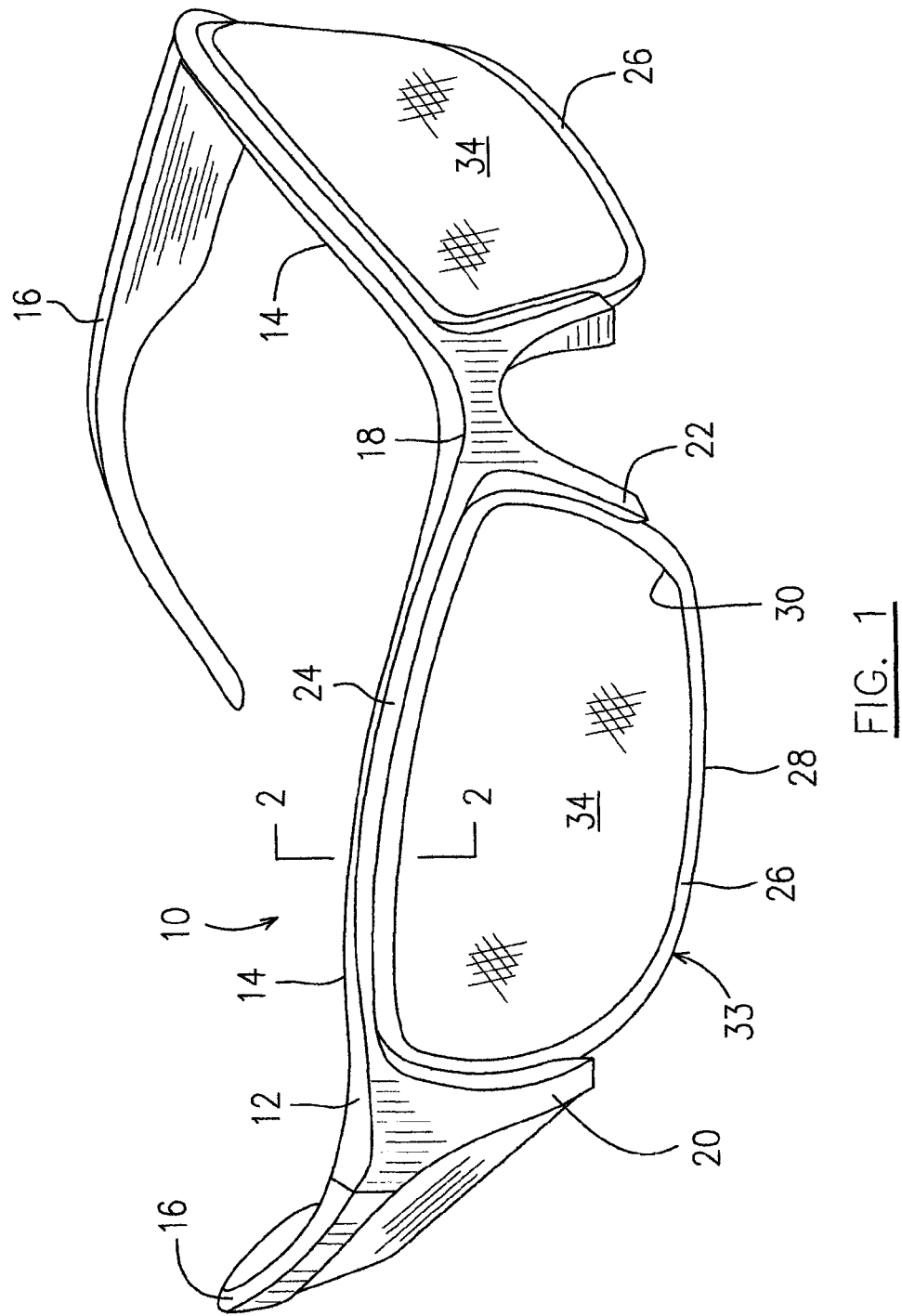
FIG. 1 is a perspective view incorporating one embodiment of the described subject matter.

Referring to FIGS. 1-2A and 6A-6B which illustrate one embodiment of the described subject matter, eyewear 10 includes a substantially flexible eyewear frame 12 such that the frame structure can be somewhat elastically deformed without damage in order to provide a comfortable feeling to the user wearing the eyewear. The substantially flexible eyewear frame 12 in accordance with the embodiment generally includes a pair of lens support sections 14 interconnected by a nose bridge 18 to form at least a front section of the eyewear when lenses are attached thereto. The substantially flexible eyewear frame 12 is integrally made of a suitable molding material which is flexible when it cures in a formation molding process. Each of the lens support sections 14 has outer and inner side portions 20, 22 spaced apart one from another and extending downwardly from an upper portion 24 of the respective lens support sections 14. A head support means such as a pair of temples 16 are, for example, pivotally attached to opposite ends of the eyewear frame 12, and may be made of similar or different molding material.

A rigid lens retaining apparatus which includes two substantially rigid lens retainers 26 according to this embodiment, permanently engages a pair of lenses 34 to form a pair of lens units 33, during a formation molding process of the respective lens retainers 26, with the respective lenses 34 present. The substantially rigid lens retainers 26 are also permanently engaged with the substantially flexible eyewear frame 12 during a formation molding process of the eyewear frame 12, with the rigid lens retaining apparatus present. The formation molding process of the substantially flexible eyewear frame 12 is conducted after formation of the respective lens units 33, that is, after the formation molding process of the respective lens retainers 26.

Each of the rigid lens retainers 26 may be made, for example of a plastic material referred to as a first molding material which is substantially rigid when cured in the formation molding process of the lens retainer 26. The formation molding process of the lens retainer 26 referred to as a first formation molding process, is separate from the formation molding process of the substantially flexible eyewear frame 12 which is referred to as a second formation molding process. During the formation molding process of the lens retainer 26, permanent attachment of the lens 34 to the lens retainer 26 may be achieved by embedding part of a peripheral portion of the lens 34 in the substantially rigid lens retainer 26 or by allowing a portion of the molding material of the lens retainer 26 to flow into at a least one cavity defined in the part of the peripheral portion of the lens 34.

For ease of discussion, only one lens retainer 26 will be described hereinafter. The lens retainer 26 may have, for example a continuous outer periphery 28. The rigid lens retainer 26 may also include, for example a continuous inner periphery 30 which defines a lens opening 32 (see FIG. 2A) for receiving a lens 34 therein. The rigid lens retainer 26 therefore encircles the lens 34.

Permanent engagement of the lens 34 to the substantially rigid lens retainer 26, for example when the lens retainer 26 is attached to the lens opening 32, may be achieved by formation of the lens retainer 26 with the lens 34 present, such that an annular groove 36 is formed along the inner periphery 30 of the substantially rigid lens retainer 26. The annular groove 36 may be configured to receive an entire peripheral edge of the lens 34 and has a dimension which is much greater than the cumulative possible elastic deformation of the lens 34 and the substantially rigid retainer 26, in order to prevent disengagement of the lens 34 from the annular groove 36 of the substantially rigid lens retainer 26, thereby ensuring permanent attachment of the lens 34 within the lens opening 32 of the lens retainer 26.

Figure 6A:
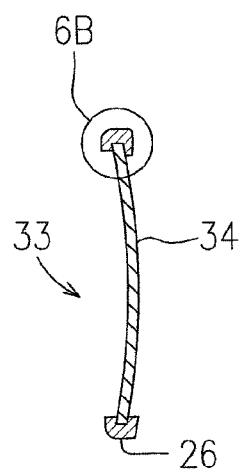
FIG. 6A is a cross-sectional view of a lens unit of the eyewear of FIG. 1, having a lens permanently engaged with a lens retainer.
Figure 6B:
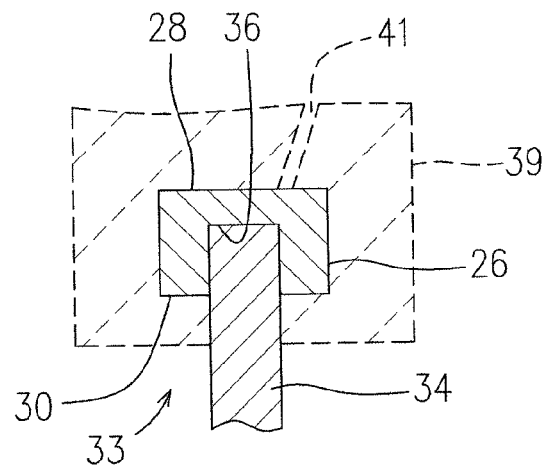
FIG. 6B an enlarged partial cross-sectional view of the lens unit of FIG. 6A as indicated in circle 6B, with a molding device, showing a formation molding process of the lens retainer with the lens present.

The first formation process is illustrated in FIG. 6B. A molding device 39 (indicated by broken lines representing a partial section thereof) may define a cavity (not indicated) in accordance with a configuration of the lens retainer 26 and the peripheral edge of the lens 34, and may include a molding injection passage 41 communicating with the cavity in order to permit injection of the first plastic molding material in an appropriate state, into the cavity during the formation molding process of the lens retainer 26 with the lens 34 present.

Prior to introduction of the first plastic molding material, the lens 34 may be placed in a predetermined position with respect to the molding device 39 and is held in position by tools (not shown) such that the lens 34 closes a major opening of the cavity. The major opening of the cavity allows the peripheral edge of the lens 34 to extend into the cavity. During the first formation molding process, the cavity is filled with the plastic material of the substantially rigid lens retainer 26, thereby forming the substantially rigid plastic lens retainer 26 which defines the lens opening 32 and the annular groove 36 therein, thereby achieving permanent attachment of the lens 34 to the substantially rigid lens retainer 26.

The first formation molding process for forming the pair of lens units 33, may include one formation molding stage with one molding device 39 having a pair of cavities for molding the pair of the lens units 33, or may include two separate formation molding stages with a pair of molding devices 39 each having one cavity configured to mold one of the pair of lens units 33.

In accordance with this embodiment as illustrated in FIG. 1, an upper section of the continuous outer periphery 28 of the lens retainer 26 is in direct contact with the eyewear frame 12, and more particularly, may be received and permanently engaged with a U-shaped profile formed by the combination of the outer and inner side portions 20, 22 and the upper portion 24 of the lens support section 14 of the frame 12.

The second formation molding process is described with reference to FIG. 2A. A molding device 40 (indicated by broken lines) which is provided to form the frame 12, defines a cavity (not numbered) in accordance with the configuration of the substantially flexible eyewear frame 12. The molding device 40 may further include a molding injection passage 42 communicating with the cavity in order to permit injection of the second molding material in an appropriate state, into the cavity during the second formation molding process. The respective pair of lens units 33 may be placed in respective first and second predetermined positions with respect to the molding device 40. A portion of the molding device 40 thereby overlaps a part of the outer peripheral portion of the lens retainers 26 at both sides thereof such that a part of the outer periphery 28 of the respective rigid lens retainer 26 may be embedded by the molding material of the substantially flexible eyewear frame 12. When the molding material of the eyewear frame 12 is cured, the lens retainers 26 are permanently engaged with the substantially flexible eyewear frame 12.

The molded frame 12 (forming the front section of the eyewear) extends between opposed ends of the frame to define a curvature of the front section of the eyewear. While the majority of the substantially flexible frame 12 (i.e. the pair of lens support sections 14) is somewhat stiffened by the substantially rigid retainers 26, the relatively flexible nose bridge 18 allows the curvature of the front section of the eyewear to conform with the contour of the user's face when the eyewear is put on user's face.

After the front section of the eyewear has been molded, the pair of the temples 16 may be pivotably attached to the opposed ends of the frame 12.

Figure 2A:
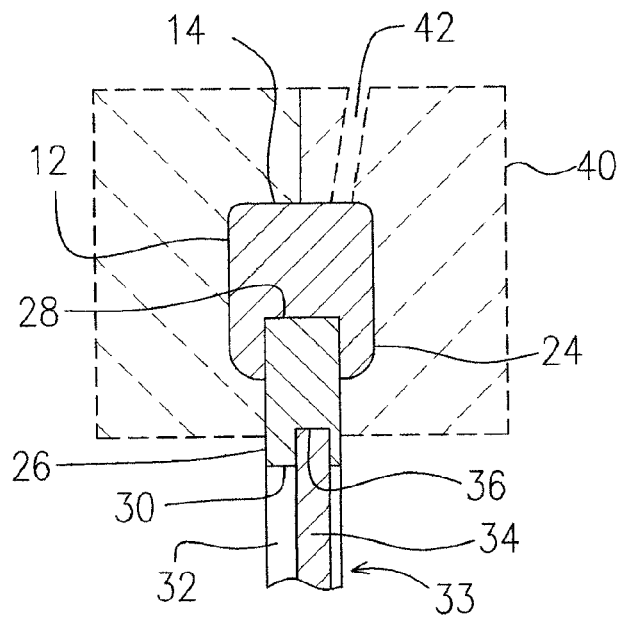
FIG. 2A is a partial cross-sectional view of a substantially flexible frame of the eyewear of FIG. 1 in a molding formation process with the presence of a rigid lens retainer.
Figure 2B:
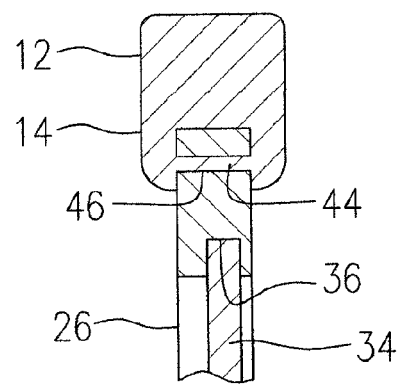
FIG. 2B is a partial cross-sectional view of the eyewear of FIG. 1 taken along line 2-2, showing a structural arrangement alternative to that shown in FIG. 2A.
Figure 2C:
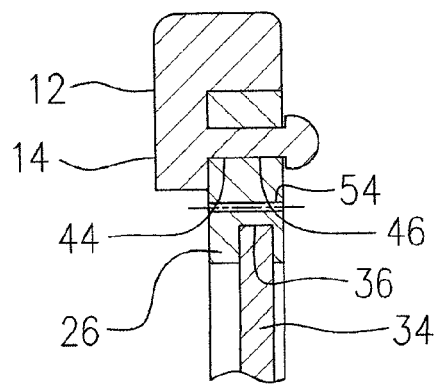
FIG. 2C is a partial cross-sectional view of the eyewear of FIG. 1 similar to the view of FIG. 2B, showing another alternative structural arrangement.
Figure 2D:
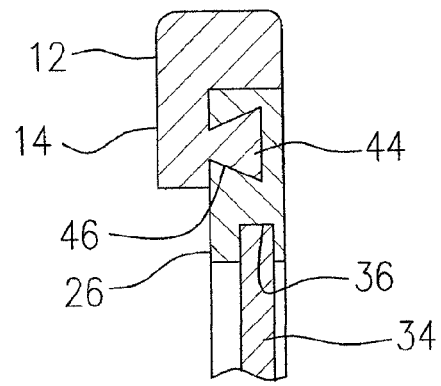
FIG. 2D is a partial cross-sectional view of the eyewear of FIG. 1 similar to the view of FIG. 2B, showing a further alternative structural arrangement.

FIGS. 2C and 2D illustrate an alternative structural arrangement of the permanent engagement of the rigid lens retainer 26 with the substantially flexible eyewear frame 12, which may be achieved by allowing a portion of the molding material of the substantially flexible eyewear frame 12 during the second formation molding process to flow into one or more cavities 46 defined in a peripheral portion of the rigid lens retainer 26, thereby forming one or more projecting elements 44 of the flexible eyewear frame 26 to be engaged within the one or more cavities 46 of the lens retainers 26, when the molding material has cured. The projecting elements 44 may be configured in various shapes, such as having an enlarged dimension at a distal end or free end thereof, in order to prevent withdrawal of the projecting elements 44 from the cavities 46. The enlarged distal or free end may be greater than the diameter of the cavity or opening 46 (see FIG. 2C) or may also be restrained within the cavity 46 (see FIG. 2D). The lens 34 is permanently engaged to the rigid lens retainer 26 during the first formation molding process.

FIG. 2B shows a further alternative structural arrangement in which a peripheral portion of the rigid lens retainer 26 may be embedded in the substantially flexible eyewear frame 12 while a portion of a molding material of the substantially flexible eyewear frame 12 is introduced into one or more cavities 46 (or openings) in the rigid lens retainer 26, during a formation molding process of the substantially flexible eyewear frame 12, in order to form the one or more projecting elements 44 (or studs) to interconnect the frame material at both ends of the lens retainer 26 and to be thereby engaged in the one or more cavities 46 (or openings).

The description of eyewear 10a illustrated in FIGS. 3, 4A and 4B, according to another embodiment, will be focused on the structural differences between eyewear 10a and the eyewear 10 of FIG. 1. The substantially flexible eyewear frame 12 of eyewear 10a, similar to that of eyewear 10 of FIG. 1, may also include a pair of lens support sections 14 interconnected by a nose bridge 18, and may be provided with pivotal temples 16. However, each of the lens support sections 14 may be configured to have a continuous inner peripheral edge 48 which defines an opening (not numbered).

Each of the rigid lens retainers 26 of eyewear 10a, similar to that of eyewear 10 of FIG. 1, includes the continuous outer and inner peripheral edges 28, 30 (see FIG. 4B). It should be noted that the rigid lens retainer 26 may be configured to substantially match but be slightly larger than the contour of the opening defined by the continuous inner peripheral edge 48 of the lens support section 14. Therefore, an entire portion of the rigid lens retainer 26 along its circumferential periphery may be embedded in the substantially flexible eyewear frame 12 during a formation molding process of the frame 12 using a method similar to that described above with regard to the formation of eyewear 10 of FIG. 1. The lens unit 33 is present during the formation molding process of eyewear 10a. As part of the lens retaining apparatus, a connection portion 50 may be provided to connect the pair of rigid lens retainers 26 and may be made of a similar or different material. The connection portion 50 may be provided integrally with or separately from the rigid lens retainers 26 during manufacturing. The connection portion 50 may also be embedded in the eyewear frame 12, for example by being completely covered by the material forming the nose bridge 18 of the eyewear frame 12 (see FIG. 4A). However, the connection portion 50 may be very thin and relatively small in cross-section with respect to other portions of the lens retainer 26. The nose bridge 18 may therefore be somewhat flexible in contrast to the lens support sections 14 of the eyewear.

Furthermore, instead of embedding the peripheral edge of the lens 34 in the retainer 26 (as in the groove 36) of eyewear 10 as shown in FIG. 2A, the rigid lens retainer 26 of the eyewear 10a in FIG. 4B may include a plurality of projecting elements, for example, studs 52 extending substantially parallel one to another and projecting outwardly from the rigid lens retainer 26. Each of the studs (projecting elements) 52 may have an enlarged free end with a diameter greater than the diameter of the opening 54. The studs 52 may extend through respective openings 54 defined along a peripheral portion of the lens 34 with the enlarged free ends of the studs 52 projecting outwardly from the openings 54, such that the lens 34 is permanently engaged with the rigid lens retainer 26 and is prevented from disengagement therefrom by the respective enlarged free ends of the studs 52 after the rigid lens retainers 26 are molded with the respective lenses 36 present.

Figure 5A:
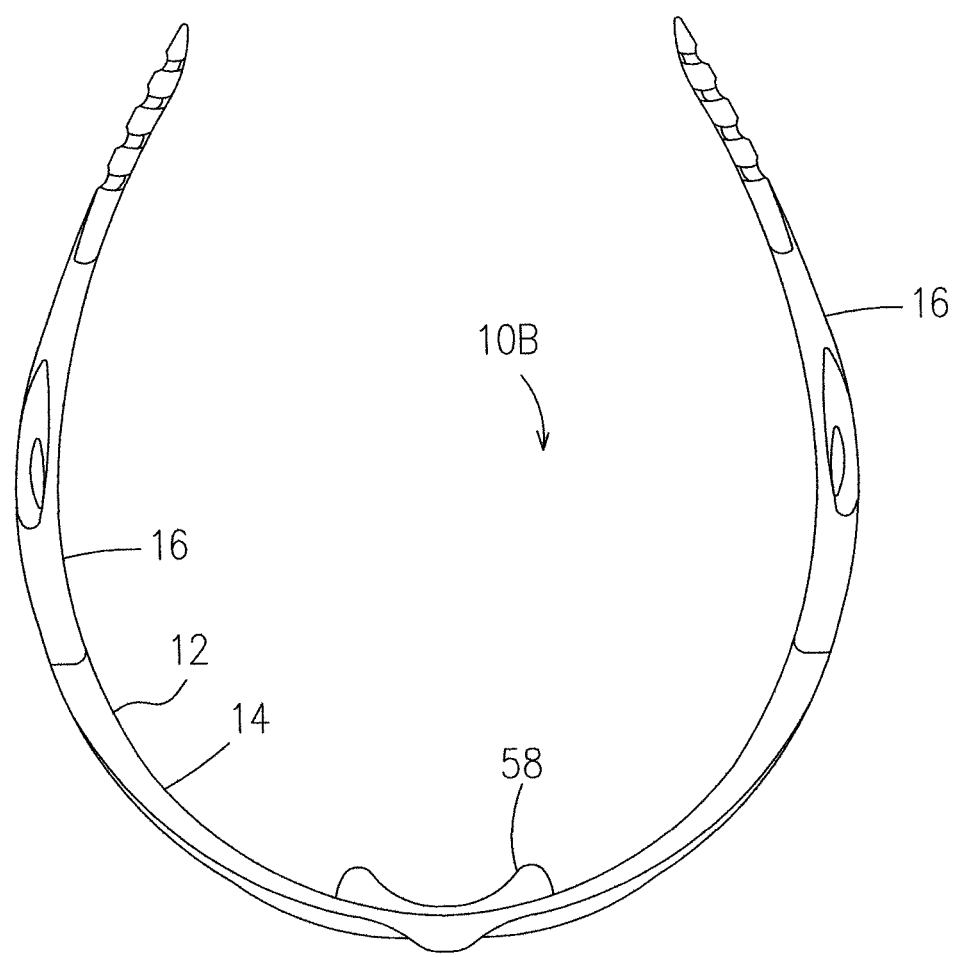
FIG. 5A is a top plan view of the eyewear according to another embodiment of the described subject matter.
Figure 5B:
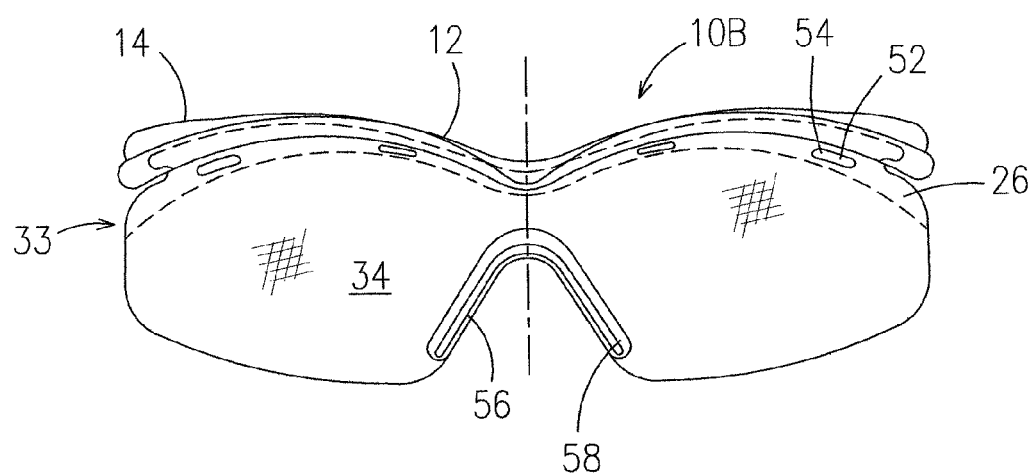
FIG. 5B is a front elevational view of the eyewear of FIG. 5A, with two temples removed.

The description of eyewear 10b as illustrated in FIGS. 5A and 5B, eyewear 10b according to a further embodiment, will be focused on the structural differences between eyewear 10b and eyewear 10 of FIG. 1. Eyewear 10b may include a substantially flexible eyewear frame 12 made in the second formation molding process similar to that of eyewear 10 of FIG. 1. The eyewear frame 10b may include an elongate base which forms a lens support section 14. The elongate base may have a curvature configured to fit a user's face, and a pair of temples 16 pivotally attached to respective opposed ends of the elongate base. A single rigid lens retainer 26 may form the lens retaining apparatus, and may be permanently attached to the lens support section 14 of the eyewear frame 12 for permanently securing a single lens 34 thereto.

A top portion of the single rigid lens retainer 26 may be embedded in a bottom portion of the substantially flexible eyewear frame 12 during the second formation molding process of the eyewear 10b with the lens unit 33 present, similar to the second formation molding process described above with reference to FIG. 2A. Therefore, permanent engagement of the single rigid lens retainer 26 with the lens support section 14 of the substantially flexible eyewear frame 12, may be achieved after the molding material of the eyewear frame 12 has been cured. Various structural arrangements such as those shown in FIGS. 2A to 2D may be selected for permanent engagement of the single rigid lens retainer 26 to the lens support section 14 of eyewear 10b.

In this embodiment the single rigid lens retainer 26 of the eyewear frame 10b may include one or more projecting elements 52 configured in an elongate profile to aesthetically correspond with the elongate base of the eyewear frame 12. The projecting elements 52 may extend through one or more elongated openings 54 defined in the single lens 34 along a top edge thereof, and may have an enlarged free end projecting outwardly from the opening 54, similar to the permanent engagement of the lens 34 to the inner periphery 30 of the lens retainer 26 of eyewear 10a as shown in FIG. 4B. Permanent engagement of the lens of eyewear 10b is completed during the formation molding process of the lens retainer 26, prior to formation of the frame 12.

The single lens 34 illustrated in FIG. 5B may define a nose recess 56 at a centre of a bottom periphery thereof. A nose support member 58 may be positioned at the nose recess 56 and may be attached to the single lens 34 by well known means.

Figure 6E:
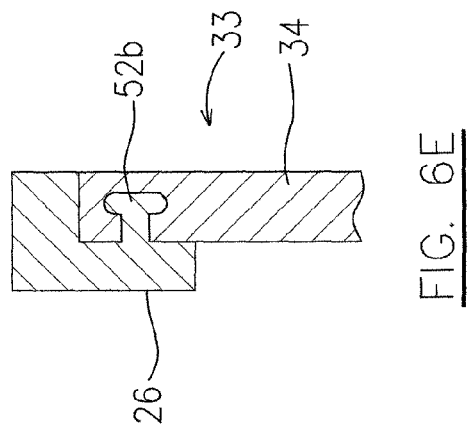
FIG. 6E is a partial cross-sectional view of the lens unit according to a still further embodiment, showing a still further structural arrangement for permanent engagement between the lens and the lens retainer.
Figure 6D:
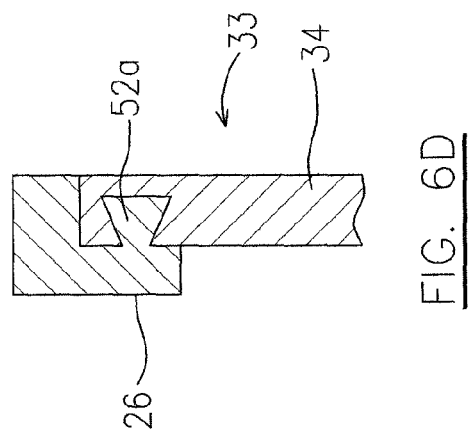
FIG. 6D is a partial cross-sectional view of the lens unit according to a further embodiment, showing a further structural arrangement for permanent engagement between the lens and the lens retainer.
Figure 6C:
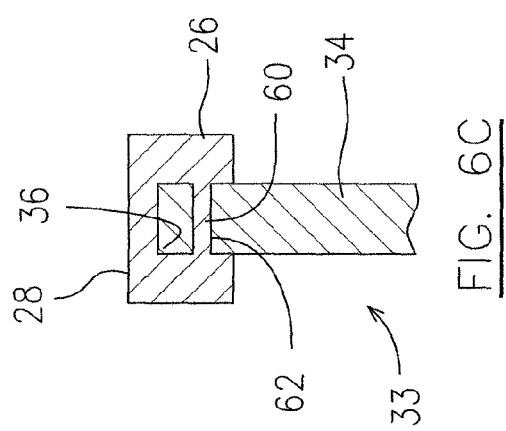
FIG. 6C is a partial cross-sectional view of the lens unit according to another embodiment, showing another structural arrangement for permanent engagement between the lens and the lens retainer.

Further alternative configurations for permanent attachment of the lens 34 to the lens retainer 26 are described with reference to FIGS. 6C-6E. In FIG. 6C, the peripheral portion of the lens 34 may be embedded in the substantially rigid lens retainer 26 while a portion of a molding material of the substantially rigid lens retainer 26 is introduced into one or more cavities in the lens 34 during the formation molding process of the lens retainer 26, in order to form one or more projecting elements 44 which in this embodiment may be integrated with the molding material of the lens retainer 26 disposed on both sides of the lens 34. The substantially rigid lens retainer 26 shown in FIGS. 6D and 6E has a plurality of projecting elements, for example 52a or 52b with a respective enlarged free end thereof, similar to the studs 54 with an enlarged free end as shown in FIG. 4B. Instead of projecting outwardly from the opening 54 defined in the lens 34 as shown in FIG. 4B, the entire stud 52a or 52b including the respective enlarged free end may be received within the cavity defined in the lens 34.

Optionally, each of the substantially rigid lens retainers may be provided with vent passages 54 (see FIG. 2C), extending through the respective lens retainer 26 such that moisture trapped behind the lens 34 can be vented through the vent passage 54 and away from a user's face while the eyewear is positioned on the user's face.

The above-description is meant to be exemplary only and one skilled in the art will recognize that changes may be made to the embodiments described without departure from the scope of the described subject matter. For example, the specific structural arrangements for permanent engagement of the substantially rigid lens retainer to the substantially flexible eyewear frame and permanent engagement of the lens to the substantially rigid lens retainer, may be configured differently from the described embodiments, or may be combined in various ways in order to provide a different aesthetic appearance of the eyewear from those of the particular embodiments described above. Permanent engagement of the lens with the substantially rigid lens retainer may be achieved by the lens retainer substantially securing the entire peripheral edge of the lens or a section of the peripheral edge of the lens, as illustrated for example in FIGS. 1 and 5B, or may be achieved in any other appropriate configuration. During formation of the substantially flexible frame with the lens unit present, the molding material of the frame may optionally be in contact with both the lens retainer and the lens such that the substantially flexible eyewear frame permanently engages both the lens retainer and the lens when the molding material of the frame has cured in the molding process. The described subject matter may also be applicable to eyewear in which other appropriate head support means such as an elastic strap may be provided, instead of a pair of pivotable temples.

Modifications which may be apparent to those skilled in the art in light of a review of this disclosure, are intended to fall within the scope of the appended claims.

I claim:

1. A method of making eyewear comprising:
   (a) providing at least one lens;
   (b) providing a lens retainer molding device for molding at least one lens retainer for engaging the at least one lens:
   (c) forming the at least one lens retainer with a first molding material in first molding process using the lens retainer molding device with the at least one lens present during a first molding process, producing at least one lens unit having both the at least one lens retainer and the at least one lens, the at least one lens retainer being substantially rigid and permanently engaging at least a part of a peripheral portion of the at least one lens;
   (d) providing a frame molding device for molding a frame for holding the at least one lens unit; and
   (e) forming the frame with a second molding material in a second molding process using the frame molding device with the at least one lens unit present during a second molding process, the frame being substantially flexible and permanently engaging the at least one lens retainer of the at least one lens unit to form at least a front section of the eyewear.

2. The method of making eyewear as defined in claim 1 wherein:
   a pair of lenses are provided in step (a);
   the lens retainer molding device provided in step (b) is for molding a pair of lens retainers for engaging the pair of the lenses, respectively;
   step (c) is conducted to form each of the lens retainers with the first molding material using the lens retainer molding device with a respective one of the lenses present during the first molding process, producing a pair of lens units each having both one of the lens retainers and one of the lenses, the lens retainers being substantially rigid and permanently engaging at least a part of the peripheral portion of the respective lenses;
   the frame molding device provided in step (d) is used to mold the frame for holding and interconnecting the pair of lens units; and
   step (e) is conducted to form the frame with the second molding material using the frame molding device with the pair of lens units present during the second molding process, the frame being substantially flexible and permanently engaging the respective lens retainer to form at least the front section of the eyewear.

3. The method as defined in claim 2 wherein the permanent engagement of each of the substantially rigid lens retainers with one of the lenses, is achieved by embedding the part of the peripheral portion of the lens in the substantially rigid lens retainer.

4. The method as defined in claim 2 wherein the permanent engagement of the substantially flexible frame with each of the substantially rigid lens retainers, is achieved by embedding a portion of the substantially rigid lens retainer in the substantially flexible frame.

5. The method as defined in claim 2 wherein the permanent engagement of each of the substantially rigid lens retainers with one of the lenses is achieved by allowing a portion of the first molding material to flow into at least one cavity defined in the part of the peripheral portion of the respective lenses.

6. The method as defined in claim 2 wherein the permanent engagement of the substantially flexible frame with each of the substantially rigid lens retainers is achieved by allowing a portion of the second molding material to flow into at least one cavity defined in the substantially rigid lens retainer.

7. The method as defined in claim 2 wherein each of the lens retainers is configured to surround an entire peripheral edge of one of the lenses.

8. The method as defined in claim 2 wherein each of the lens retainers is configured to engage only a circumferential part of the peripheral edge of one of the lenses.

9. The method as defined in claim 8 wherein the substantially flexible frame permanently engages both the lens retainers and the lenses.

10. The method as defined in claim 2 comprising a further step of attaching a pair of temples to opposed ends of the frame.

11. The method as defined in claim 2 wherein the molded frame extends between opposed ends of the frame to define a curvature of the front section of the eyewear.

12. The method as defined in claim 11 wherein the substantially flexible frame comprises a nose bridge interconnecting a pair of lens support sections of the frame which secure the respective substantially rigid lens retainers to allow the curvature of the front section of the eyewear to conform to the contour of a user's face.

13. The method as defined in claim 12 wherein each of the substantially rigid lens retainers comprises a vent passage extending through the respective lens retainer.

* * * * *